United States Patent Office 2,844,975
Patented July 29, 1958

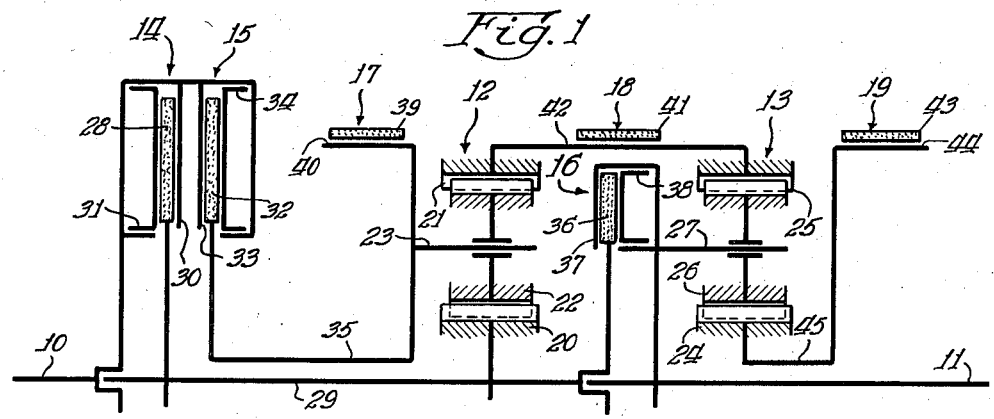
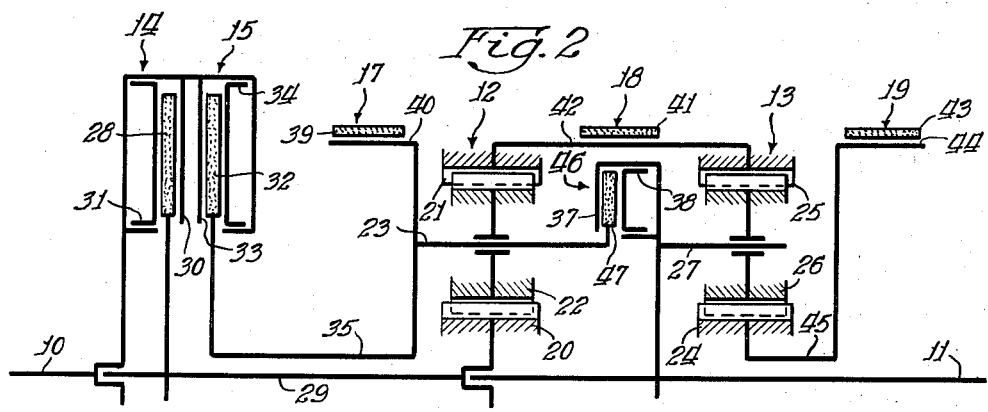
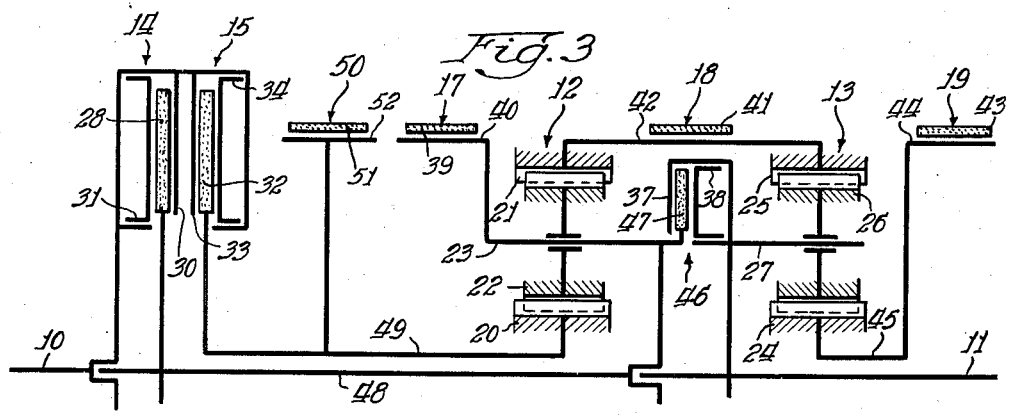

2,844,975

PLANETARY GEARING DESIGNS

Donald W. Kelbel and Palmer Orr, Muncie, Ind., assignors to Borg-Warner Corporation, Chicago, Ill., a corporation of Illinois Application July 18, 1956, Serial No. 598,703

9 Claims. (Cl. 74—759)

This invention relates to transmissions particularly adapted for use in automotive vehicles.

It is the object of the present invention to provide an automotive transmission comprising two simple planetary gear units which are interconnected so as to provide at least three forward speed drives and a reverse drive. The forward speed drives are suitably spaced and of such a ratio with respect to each other as to provide a suitable connection between an ordinary internal combustion automotive engine and the driving road wheels of the vehicle. It is an object to so interconnect the two simple planetary gear units that only a minimum number of engaging devices for providing these drives are required. It is contemplated that each of these engaging devices may be of the friction type, so that the various drives through the transmission may be gradually completed. The transmission may be controlled, for example, by three brakes and three clutches in order to provide three usable forward drive ratios and a usable drive in reverse.

It is another object to so interconnect the simple planetary gear units that in order to shift from low to intermediate and finally to high speed forward drive, a minimum number of simultaneous engagements and disengagements of the engaging devices are required for the ratio changes.

It is a further object to so arrange the transmission that a reverse drive which is lower in numerical speed ratio than the low speed forward drive is obtained.

It is also an object to so arrange the transmission that two readily available elements of the first gear set can be connected by means of clutches with the transmission drive shaft, and that three readily available elements of the two gear units may be braked in order to provide the various drives. We contemplate a plurality of different embodiments in each of which the carrier and the sun gear of the first unit can be connected to the drive shaft and in which brakes are provided for the carrier of the first unit and for the sun gear of the second unit and in which the ring gears of the two units are connected together, and a brake is provided for the ring gears.

The invention consists of the novel constructions, arrangements and devices to be hereinafter described and claimed for carrying out the above stated objects and such other objects as will appear from the following description of preferred embodiments of the invention illustrated with reference to the accompanying drawings, wherein:

Fig. 1 is a diagrammatic illustration of a transmission embodying the principles of the invention;

Fig. 2 is a diagrammatic illustration of a transmission constituting a modification of the invention; and Fig. 3 is a diagrammatic illustration of a transmission constituting another modification of the invention.

Like characters of reference designate like parts in the several views.

Referring now to Fig. 1, the illustrated transmission comprises a drive shaft 10 and a driven shaft 11. The drive shaft 10 is adapted to be driven by the engine (not shown) of the vehicle in which the transmission is installed, and the driven shaft 11 is adapted to drive the rear driving road wheels (not shown) of the vehicle through any suitable drive connections (not shown).

The transmission comprises, in general, a planetary gear set 12, a second planetary gear set 13, three friction clutches 14, 15 and 16 and three friction brakes 17, 18 and 19.

The planetary gear set 12 comprises a sun gear 20, a ring gear 21, a plurality of planet gears 22 in mesh with the sun gear 20 and the ring gear 21 and a planet gear carrier 23 for the planet gears 22. The planetary gear set 13 comprises a sun gear 24, a ring gear 25, a plurality of planet gears 26 in mesh with the sun gear 24 and the ring gear 25 and a planet gear carrier 27 for the planet gears 26. The ring gear 25 is connected to the ring gear 21, and the planet gear carrier 27 is connected to the driven shaft 11.

The friction clutch 14 comprises a clutch disc 28, connected through a shaft 29 to the sun gear 20, and a pressure plate 30, the latter being connected to the drive shaft 10. The clutch 14 comprises also a piston 31 fluid pressure actuated in order to grip the disc 28 between the pressure plate 30 and the piston 31.

The friction clutch 15 comprises a clutch disc 32, a pressure plate 33 and a piston 34 fluid pressure actuated to grip the clutch disc 32 between the pressure plate 33 and the piston 34. The clutch disc 32 is connected to the planet gear carrier 23 by means of a quill shaft 35 which is rotatably disposed on the shaft 29. The pressure plate 33 is connected to the drive shaft 10.

The friction clutch 16 comprises a clutch disc 36, a pressure plate 37 and a piston 38 fluid pressure actuated to grip the clutch disc 36 between the pressure plate 37 and the piston 38. The clutch disc 36 is connected to the shaft 29 and the sun gear 20. The pressure plate 37 is connected to the planet gear carrier 27 and the driven shaft 11.

The friction brake 17 comprises a brake band 39 engageable on a brake drum 40. The brake drum 40 is connected to the planet gear carrier 23 and the shaft 35.

The friction brake 18 comprises a brake band 41 engageable on a brake drum 42 constituting a portion of the connection between the ring gears 25 and 21.

The friction brake 19 comprises a brake band 43 engageable on a brake drum 44. The brake drum 44 is connected to the sun gear 24 by means of a shaft 45. The shaft 45 is rotatably disposed on the driven shaft 11.

The brake bands 39, 41 and 43 may be engaged with their respective brake drums 40, 42 and 44 by any suitable means such as fluid pressure actuated servomotors of any well-known type (not shown).

In operation, the transmission provides low, intermediate, direct and overdrive forward speed drives and a drive in reverse. The transmission, when the clutches 14, 15 and 16 and the brakes 17, 18 and 19 are all disengaged, is in a neutral condition, and the shaft 11 is not driven from the shaft 10 when the latter is driven. The low speed forward drive, which may be referred to as first speed, is completed by engaging the clutches 14 and 15 and the brake 19. In low speed forward drive, the power flows from the drive shaft 10 through the clutch 14 and the shaft 29 to the sun gear 20. Power also flows from the drive shaft 10 through the clutch 15 and the shaft 35 to the planet gear carrier 23. As is well-known, when two elements of a planetary gear set are driven at the same speed, all of the elements of the gear set rotate together as a unit at this speed. The ring gear 21 is thus driven at the same speed as the drive shaft 10, and power flows from the ring gear 21 to the ring gear 25 of the planetary gear set 13. The brake 19 when engaged holds the sun gear 24 against rotation, and the sun gear 24 functions as the reaction element for the planetary gear set 13. Thus, as the ring gear 25 rotates, the planet gears 26 planetate about the sun gear 24 causing the carrier 27 and therefore the driven shaft 11 connected thereto to be driven at a decreased speed but increased torque with respect to the ring gear 25 and therefore with respect to the drive shaft 10, the ring gear 25 and the drive shaft 10 being connected in substance together in a direct drive.

The intermediate forward speed drive, which may be termed second speed, is completed by disengaging the clutch 14, engaging the clutch 16 and allowing the clutch 15 and the brake 19 to remain engaged. In this case, power flows from the drive shaft 10 through the clutch 15 and the shaft 35 to the planet gear carrier 23. The clutch 16 when engaged connects the carrier 27 of the gear set 13 with the sun gear 20 of the gear set 12, and as has been previously described, the ring gears 25 and 21 are connected together. Since two elements of the gear set 13 are thus connected to two elements of the gear set 12, the gear sets 12 and 13 function and cooperate together to form a single planetary gearing system, with the carrier 23 driven by the drive shaft 10 constituting the driving element of the gearing system. The driven shaft 11 constitutes the output element of the gearing system; and the sun gear 24 which remains braked by the brake 19, constitutes the reaction element of the gearing system. The power flows through the gearing system, particularly from the sun gear 20 through the clutch 16 to the carrier 27 and the driven shaft 11 and from the ring gear 21 to the ring gear 25, so that the carrier 27 and the driven shaft 11 are driven. The driven shaft 11 in this case is driven at a speed which is increased with respect to its speed in low speed drive but is still less than the speed of the drive shaft 10.

Direct forward speed drive, which may be referred to as third speed, is completed by engaging the clutch 14, disengaging the clutch 15 and disengaging the brake 19 and allowing the clutch 16 to remain engaged. In this case, the power flows from the drive shaft 10 through the clutch 14, the shaft 29, and the clutch 16 to the driven shaft 11.

The overdrive power train is completed by disengaging the clutch 14, engaging the clutch 15 and the brake 18 and allowing the clutch 16 to remain engaged. In this case, the power flows from the drive shaft 10 through the clutch 15 and the shaft 35 to the planet gear carrier 23. The brake 18 holds the ring gear 21 against rotation, so that the ring gear 21 functions as a reaction element for the gear set 12, causing the sun gear 20 to be driven at a fast overdrive speed with respect to the carrier 23 and the drive shaft 10. The clutch 16 connects the sun gear 20 directly to the driven shaft 11, causing the driven shaft 11 to be driven at the same overdrive speed as the sun gear 20.

Reverse drive is obtained by engaging the clutch 14 and the brakes 17 and 19. In this case the power flows from the drive shaft 10 through the clutch 14 and the shaft 29 to the sun gear 20. The brake 17 holds the planet gear carrier 23 against rotation, so that the carrier 23 functions as a reaction element for the gear set 12. The rotation of the sun gear 20 is transmitted through the planet gears 22 to the ring gear 21, causing the ring gear 21 to be driven at a reduced speed in the reverse direction. The ring gear 25 being connected to the ring gear 21 is a driven at the same speed and in the same direction. The brake 19 holds the sun gear 24 so that it functions as the reaction element for the planetary gear set 13. The ring gear 25 drives the planet gears 26, causing them to planetate around the sun gear 24 and thereby driving the planet gear carrier 27 and the driven shaft 11 in a reverse direction with respect to the drive shaft 10 at a still greater reduced speed than the speed of the ring gear 25.

It will be understood that the sizes of the gears in the gear sets 12 and 13 may be varied; however, for the purpose of illustration only, a table is set forth below illustrating the speed ratios obtainable by the transmission with one particular size for each of the gears in the gear sets 12 and 13, and the table also sets forth in tabular form the various brakes and clutches that are engaged for completing the various drives through the transmission.

The particular and numerical ratios for the various drives through this transmission are obtained when the gears have the following number of teeth:

Sun gear 20—21 teeth
Ring gear 21—55 teeth
Sun gear 24—24 teeth
Ring gear 25—48 teeth It will be understood that gears with other numbers of teeth may be used if desired to obtain other numerically different speed ratios, all within the scope of the present invention.

| Speeds | C14 | C15 | C16 | B17 | B18 | B19 | Ratios |
|---|---|---|---|---|---|---|---|
| 1st | On | On | | | | On | 1.50 to 1.00 |
| 2nd | | On | On | | | On | 1.361 to 1.00 |
| 3rd | On | | On | | | | 1.00 to 1.00 |
| 4th | | On | On | | On | | .276 to 1.00 |
| Rev | On | | | On | | On | 3.928 to 1.00 |

The second embodiment of the transmission illustrated in Fig. 2 is the same as the Fig. 1 embodiment except that the clutch 16 is deleted, and the clutch 46 is substituted in lieu thereof. The clutch 46 comprises the same pressure plate 37 and piston 38 utilized in the clutch 16. The clutch 46 comprises, in addition, a clutch disc 47 adapted to be gripped between the piston 38 and the pressure plate 37. The clutch disc 47 is connected to the carrier 23 of the gear set 12, so that the clutch 46, when engaged, connects the carriers 23 and 27 together.

In operation the transmission provides low, intermediate and direct forward speed drives and a drive in reverse. The transmission when the clutches 14, 15, and 46 and the brakes 17, 18 and 19 are all disengaged is in a neutral condition, and the shaft 11 is not driven from the shaft 10 when the latter is driven. The low speed forward drive, which may be referred to as first speed, is completed by engaging the clutches 14 and 46 and the brake 18. In low speed drive the power flows from the drive shaft 10 through the clutch 14 and the shaft 29 to the sun gear 20. The brake 18 when engaged holds the ring gear 21 against rotation, and the ring gear 21 functions as the reaction element for the planetary gear set 12. Thus, power is transmitted by the sun gear 20 to the planet gears 22 causing them to planetate within the ring gear 21 and causing the planet gear carrier 23 to be driven at a greatly reduced speed with respect to the sun gear 20 and the shaft 29. Power from the planet gear carrier 23 is trasmitted to the driven shaft 11 through the clutch 46. Thus, the driven shaft 11 is driven at the same speed as the planet gear carrier 23.

The intermediate forward speed drive, which may be termed second speed, is completed by disengaging the clutch 46 and the brake 18, allowing the clutch 14 to remain engaged and engaging the clutch 15 and the brake 19. Power flows from the drive shaft 10 through the clutch 14 and the shaft 29 to the sun gear 20. Power flows in another path from the drive shaft 10 through the clutch 15 and the quill shaft 35 to the planet gear carrier 23, the latter being driven at the same speed as the sun gear 20. Since two elements of the gear set 12, namely the sun gear 20 and the planet gear carrier 23, are driven at the same speed as the shaft 10, all of the elements of the gear set 12 rotate together at the same speed as the shaft 10. Power is transmitted from the ring gear 21 to the ring gear 25. Since the two ring gears 21 and 25 are connected, the ring gear 25 rotates at the same speed as the elements of the gear set 12 and the drive shaft 10. With the brake 19 being effective to hold the sun gear 24 against rotation the latter functions as a reaction element for the gear set 13. Power is transmitted from the ring gear 25 to the planet gears 26 causing them to planetate about the sun gear 24. Thus the planet gear carrier 27 and the driven shaft 11 connected thereto are driven in a forward direction but at a slightly reduced speed with respect to the ring gear 25.

Direct forward speed drive is completed by disengaging the brake 19, engaging the clutch 46 and allowing the clutches 14 and 15 to remain engaged. Power flows from the drive shaft 10 through the clutch 15 and the quill shaft 35 to the planet gear carrier 23. When the clutch 46 is engaged, a direct drive is formed between the gear carrier 23 and the gear carrier 27 and the driven shaft 11 so that the driven shaft 11 rotates at the same speed as the drive shaft 10. Although the clutch 14 has previously been explained as being engaged for this drive, actually no power is transmitted at this time through the clutch 14, and it may be disengaged if desired.

Reverse drive through the transmission is completed in exactly the same manner as in the first embodiment.

Here again it will be understood that the sizes of the gears in the gear sets 12 and 13 may be varied; however, for the purpose of illustration only, a table is set forth below illustrating the speed ratios obtainable by the transmission with one particular size for each of the gears in the gear sets 12 and 13. The table also sets forth in tabular form the various brakes and clutches that are engaged for completing the various drives through the transmission.

| Speeds | C14 | C15 | C46 | B17 | B18 | B19 | Ratios |
|---|---|---|---|---|---|---|---|
| 1st | On | | On | | On | | 3.619 to 1.00 |
| 2nd | On | On | | | | On | 1.50 to 1.00 |
| 3rd | On | On | On | | | | 1.00 to 1.00 |
| Rev | On | | | On | | On | 3.928 to 1.00 |

The Fig. 3 embodiment of the invention is the same as the embodiment shown in Fig. 2 except that the shafts 29 and 35 are deleted and are replaced by the shafts 48 and 49, and an additional brake 50 is added. The shaft 48 connects the clutch disc 28 of the clutch 14 with the carrier 23 and with the clutch disc 47 of the clutch 46. The shaft 49 is a quill shaft mounted for rotation on the shaft 48 and connects the clutch disc 32 with the sun gear 20. The brake 50 is similar in construction to the other brakes 17, 18 and 19 and comprises a brake band 51 engageable on a drum 52. The drum 52 is connected to the shaft 49 so that the brake 50 may brake the sun gear 20.

In operation the transmission provides a low or first speed, progressively higher intermediate second and third forward speeds, a fourth or direct forward speed drive and a drive in reverse. The transmission when the clutches 14, 15 and 46 and the brakes 50, 17, 18 and 19 are all disengaged is in a neutral condition and the shaft 11 is not driven from the shaft 10 when the latter is driven. The low speed forward drive which may be referred to as first speed, is completed by engaging the clutches 15 and 46 and the brake 18. The power flows from the drive shaft 10 through the clutch 15 and the shaft 49 to the sun gear 20. The brake 18 when engaged holds the ring gear 21 against rotation, and the ring gear 21 functions as a reaction element for the planetary gear set 12. Power is transmitted from the sun gear 20 to the planet gears 22 causing them to planetate within the ring gear 21 and to drive the planet gear carrier 23 in a forward direction with respect to the drive shaft 10 at a greatly reduced speed. With the clutch 46 engaged the planet gear carrier 27 and the driven shaft 11 connected thereto are driven at the same speed as the planet gear carrier 23.

Second speed forward drive through the transmission is completed by disengaging the clutch 46 and the brake 18, engaging the clutch 14 and the brake 19 and allowing the clutch 15 to remain engaged. Power flows from the driving shaft 10 through the clutch 14 and the shaft 48 to the planet gear carrier 23. Power also flows from the drive shaft 10 through the clutch 15 and the quill shaft 49 to the sun gear 20. Because two elements of the gear set 12 are driven at the same speed, all of the elements of the gear set 12 rotate together as a unit at the speed of the drive shaft 10. Since the ring gear 25 is connected to the ring gear 21, the former also is driven at the same speed as the elements of the planetary gear set 12 and the drive shaft 10. The brake 19 when engaged holds the sun gear 24 against rotation, and the sun gear 24 functions as the reaction element for the planetary gear set 13. Thus, as the ring gear 25 rotates it drives the planet gears 26 so that they planetate about the sun gear 24 causing the carrier 27 and therefore the driven shaft 11 connected thereto to be driven at a decreased speed but increased torque with respect to the ring gears 25 and 21 and the drive shaft 10.

Third speed forward drive through the transmission is completed by disengaging the clutch 15, engaging the brake 50 and allowing the clutch 14 and the brake 19 to remain engaged. Power flows from the drive shaft 10 through the clutch 14 and the shaft 48 to the planet gear carrier 23. The brake 50, when engaged, holds the sun gear 20 against rotation, and the sun gear 20 functions as a reaction element for the gear set 12. Rotation of the carrier 23 causes the planet gears 22 to planetate around the sun gear 20 and thereby drive the ring gear 21 at an overdrive speed and in the same direction as the planet gear carrier 23. Power then flows from the ring gear 21 to ring gear 25, the two ring gears being connected together. The brake 19 when engaged holds the sun gear 24 against rotation, and the sun gear 24 then functions as the reaction element for the gear set 13. The ring gear 25 drives the planet gears 26 causing them to planetate about the sun gear 24 so as to drive the carrier 27 and therefore the driven shaft 11 connected thereto at a decreased speed but increased torque with respect to the ring gear 25.

Direct forward speed drive, which may be referred to as fourth speed or high, is completed by disengaging the brakes 50 and 19, engaging the clutch 46 and allowing the clutch 14 to remain engaged. Power flows from the drive shaft 10 through the clutch 14, the shaft 48 and the clutch 46 to the driven shaft 11.

Reverse drive is obtained by engaging the clutch 15 and the brakes 17 and 19. Power flows from the drive shaft 10 through the clutch 15 and the quill shaft 49 to the sun gear 20. The brake 17 holds the planet gear carrier 23 against rotation so that the carrier 23 functions as the reaction element for the gear set 12. The rotation of the sun gear 20 is transmitted through the planet gears 22 to the ring gear 21 causing the latter to be driven in the reverse direction from the sun gear 20 and the drive shaft 10 and at a reduced speed. The ring gear 25 being connected to the ring gear 21 is driven at the same speed and in the same direction. The brake 19 holds the sun gear 24 so that it functions as the reaction element for the gear set 13. The ring gear 25 drives the planet gears 26 causing them to planetate around the sun gear 24 and thereby drive the planet gear carrier 27 and the driven shaft 11 connected thereto at a still greater reduced speed than the speed of the ring gear 25.

For the purpose of illustration only, another table is set forth below illustrating the speed ratios obtainable by the transmission of Fig. 3 with one particular size for each of the gears in the sets 12 and 13. The table also sets forth in tabular form a designation of the various brakes and clutches that are engaged for completing the various drives through the transmission.

| Speeds | C14 | C15 | C46 | B50 | B17 | B18 | B19 | Ratios |
|---|---|---|---|---|---|---|---|---|
| 1st | | On | On | | | On | | 3.619 to 1.00 |
| 2nd | On | On | | | | | On | 1.500 to 1.00 |
| 3rd | On | | | On | | | On | 1.084 to 1.00 |
| 4th | On | | On | | | | | 1.00 to 1.00 |
| Rev | | On | | | On | | On | 3.928 to 1.00 |

The numerical values of the ratios set forth above are those obtained with the particular gear sizes hereinbefore mentioned, and it will be understood that these gear sizes may be changed if desired all within the scope of this invention. It will be noted that the numerical value of the third speed ratio given above is only slightly less than direct drive. This ratio may be changed in value by changing the gear sizes to space it further from direct drive if desired.

Our transmission advantageously utilizes two simple planetary gear sets so connected as to provide a suitable spacing of speed ratios for automotive use. In order to shift between ratios, it is necessary to simultaneously engage and disengage a minimum number of friction brakes and clutches. All of the engaging devices in the transmission embodiments are of the friction type so that each of these may be gradually engaged to give a smooth friction drive. The embodiments of my transmission furthermore include a minimum number of friction devices to obtain a suitable number of drive speed ratios. As has been previously noted, the embodiments of Fig. 1 and Fig. 2 include three clutches and three brakes, and the Fig. 3 embodiment includes three clutches and four brakes.

Furthermore, reverse drive has a relatively large ratio so as to be completely suitable for any type of vehicle. In shifting between the first three ratios which may be the only ones used, if desired, exclusive of reverse, it is necessary only to disengage one or two friction devices while at the same time engaging another in order to shift upward from first to second and finally to third speed ratio. A smooth upshift may be obtained with controls of maximum simplicity. The Fig. 2 embodiment of the invention advantageously may provide a reverse drive which is lower in numerical ratio than low speed forward drive. The Fig. 3 embodiment advantageously provides a third speed drive which may be used alternately with the direct drive. The reverse drive advantageously is slightly less numerically than the low speed forward drive.

We wish it to be understood that our invention is not to be limited to the specific constructions and arrangements shown and described except only insofar as the appended claims may be so limited. In particular, we wish it to be understood that the number of teeth on the gear units and the numerical values of ratios hereinbefore mentioned are for purposes of illustration only, and the invention is not to be limited to such values.

We claim:

1. In a transmission, the combination of a drive shaft, a driven shaft, a first planetary gear set comprising a sun gear element and a ring gear and a planet gear in mesh with said sun gear element and said ring gear and a planet gear carrier element, a first clutch for connecting said sun gear element with said drive shaft, a second clutch for connecting said carrier element with said drive shaft, a second planetary gear set comprising a ring gear and a sun gear and a planet gear in mesh with the sun and ring gears and a planet gear carrier, said last named carrier being connected to said driven shaft and said ring gears of said first and second gear sets being connected together, a brake for said sun gear of said second gear set, said clutches and brake when all are engaged completing a reduced speed power train from said drive shaft to said driven shaft, and a clutch for connecting one of said elements with said driven shaft for completing a direct drive between said shafts when the clutch and also said clutch connecting said last named element with said drive shaft are both engaged.

2. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said sun gear of said first gear set with drive shaft, said ring gears of said two gear sets being connected together, a second clutch for connecting said carrier of said first gear set to said carrier of said second gear set, a first brake for said two ring gears, said carrier of said second gear set being connected to said driven shaft, said clutches and brake when all are engaged completing a reduced speed power train from said drive shaft to said driven shaft, a third clutch for connecting said carrier of said first gear set with said drive shaft, and a second brake for said sun gear of said second gear set, said third clutch and said second brake when both are engaged along with said first clutch completing another reduced speed power train from said drive shaft to said driven shaft.

3. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said sun gear of said first gear set with said drive shaft, a second clutch for connecting said gear carrier of said first gear set with said drive shaft, a third clutch for connecting said sun gear of said first gear set with said gear carrier of said second gear set, a first brake for said sun gear of said second gear set, and a second brake for said gear carrier of said first gear set, the ring gears of the said two gear sets being connected together, said carrier of said second gear set being connected to said driven shaft, said first clutch and said second clutch and said first brake when all are engaged completing a reduced speed forward drive from said drive shaft to said driven shaft, said second clutch and said third clutch and said first brake when all are engaged completing another reduced speed forward drive from said drive shaft to said driven shaft, said first and third clutches when both are engaged completing a direct drive and said first clutch and said first and second brakes when all are engaged completing a reverse drive from said drive shaft to said driven shaft.

4. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said sun gear of said first gear set with said drive shaft, a second clutch for connecting said gear carrier of said first gear set with said drive shaft, a third clutch for connecting said sun gear of said first gear set with said gear carrier of said second gear set, and a brake for said sun gear of said second gear set, the ring gears of said two gear sets being connected together, said gear carrier of said second gear set being connected to said driven shaft, said first and second clutches and said brake when all are engaged completing a reduced speed forward drive from said drive shaft to said driven shaft, said second and third clutches and said brake when all are engaged completing another reduced speed forward drive from said drive shaft to said driven shaft, said first and third clutches when both are engaged completing a direct drive.

5. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said sun gear of said first gear set with said drive shaft, a second clutch for connecting said gear carrier of said first gear set with said drive shaft, a third clutch for connecting said gear carrier of said first gear set with said gear carrier of said second gear set, a first brake for said sun gear of said second gear set, and a second brake for said gear carrier of said first gear set, said ring gears of said two gear sets being connected together, said carrier of said second gear set being connected to said driven shaft, said first and second clutches and said first brake when all are engaged completing a reduced speed forward drive from said drive shaft to said driven shaft, said second and third clutches when engaged completing a direct drive, said first clutch and said first and second brakes when all are engaged completing a reverse drive from said drive shaft to said driven shaft.

6. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said gear carrier of said first gear set with said drive shaft, a second clutch for connecting said sun gear of said first gear set with said drive shaft, a third clutch for connecting said gear carrier of said first gear set with said gear carrier of said second gear set, said ring gears of said two gear sets being connected together, a first brake for said ring gears, a second brake for said sun gear of said second gear set, and a third brake for said gear carrier of said first gear set, said gear carrier of said second gear set being connected with said driven shaft, said second and third clutches and said first brake when all are engaged completing a low speed drive from said drive shaft to said driven shaft, said first and second clutches and said second brake when all are engaged completing a second speed drive from said drive shaft to said driven shaft, said first and third clutches when engaged completing a direct drive, said second clutch and said first and third brakes when all are engaged completing a reverse drive from said drive shaft to said driven shaft.

7. In a transmission, the combination of a drive shaft, a driven shaft, a first planetary gear set and a second planetary gear set, each of said gear sets comprising a sun gear and a ring gear and a planet gear in mesh with the sun and ring gears and a planet gear carrier, a first clutch for connecting said gear carrier of said first gear set with said drive shaft, a second clutch for connecting said sun gear of said first gear set with said drive shaft, a third clutch for connecting said gear carrier of said first gear set with said gear carrier of said second gear set, said ring gears of said two gear sets being connected together, a first brake for said ring gears of said two gear sets, a second brake for said sun gear of said second gear set, and a third brake for said sun gear of said first gear set, said gear carrier of said second gear set being connected to the driven shaft, said second and third clutches and said first brake when all are engaged completing a low speed forward drive from said drive shaft to said driven shaft, said first and second clutches and said second brake when all are engaged completing a second speed forward drive from said drive shaft to said driven shaft, said first clutch and said second and third brakes when all are engaged completing a third speed forward drive from said drive shaft to said driven shaft which is only slightly less than direct drive.

8. In a transmission, the combination of a drive shaft, a driven shaft, a first planetary gear set and a second planetary gear set, each of said gear sets comprising a sun gear element and a ring gear element and a planet gear in mesh with the sun and ring gear elements and a planet gear carrier element, coupling means for connecting two of said elements of said first gear set to said drive shaft, the third of said elements of said first gear set being connected to said ring gear element of said second gear set and a braking means for said sun gear element of said second gear set, said carrier element of said second gear set being connected to said driven shaft, said coupling means and said braking means when all are engaged completing a reduced speed drive from said drive shaft to said driven shaft, a clutch for connecting together two elements of said two gear sets and a brake for said ring gear element of said second gear set, said clutch and said brake when engaged with one of said first-named coupling means completing another change-speed drive between said shafts.

9. In a transmission, the combination of a drive shaft, a driven shaft, a first planetary gear set and a second planetary gear set each of which comprises a sun gear element and a ring gear element and a planet gear in mesh with said sun gear element and said ring gear element and a planet gear carrier element, a pair of clutches connecting two of said elements of said first gear set to said drive shaft, the third of said elements of said first gear set being connected to one of said elements of said second gear set and a brake for holding a second one of said elements of said second gear set, the third of said elements of said second gear set being connected to said driven shaft, said clutches and said brake when all are engaged completing a change speed drive from said drive shaft to said driven shaft, and a third clutch for connecting together an element of said second gear set and an element of said first gear set for completing another reduced speed power train from said drive shaft to said dirven shaft when one of said first-named clutches and said brake are also engaged and for completing a direct drive between said shafts when said third clutch and the other of said first-named clutches are engaged.

References Cited in the file of this patent

FOREIGN PATENTS

| | | |
|---|---|---|
| 600,791 | Great Britain | April 19, 1948 |
| 658,964 | Great Britain | Oct. 17, 1951 |